UNITED STATES PATENT OFFICE.

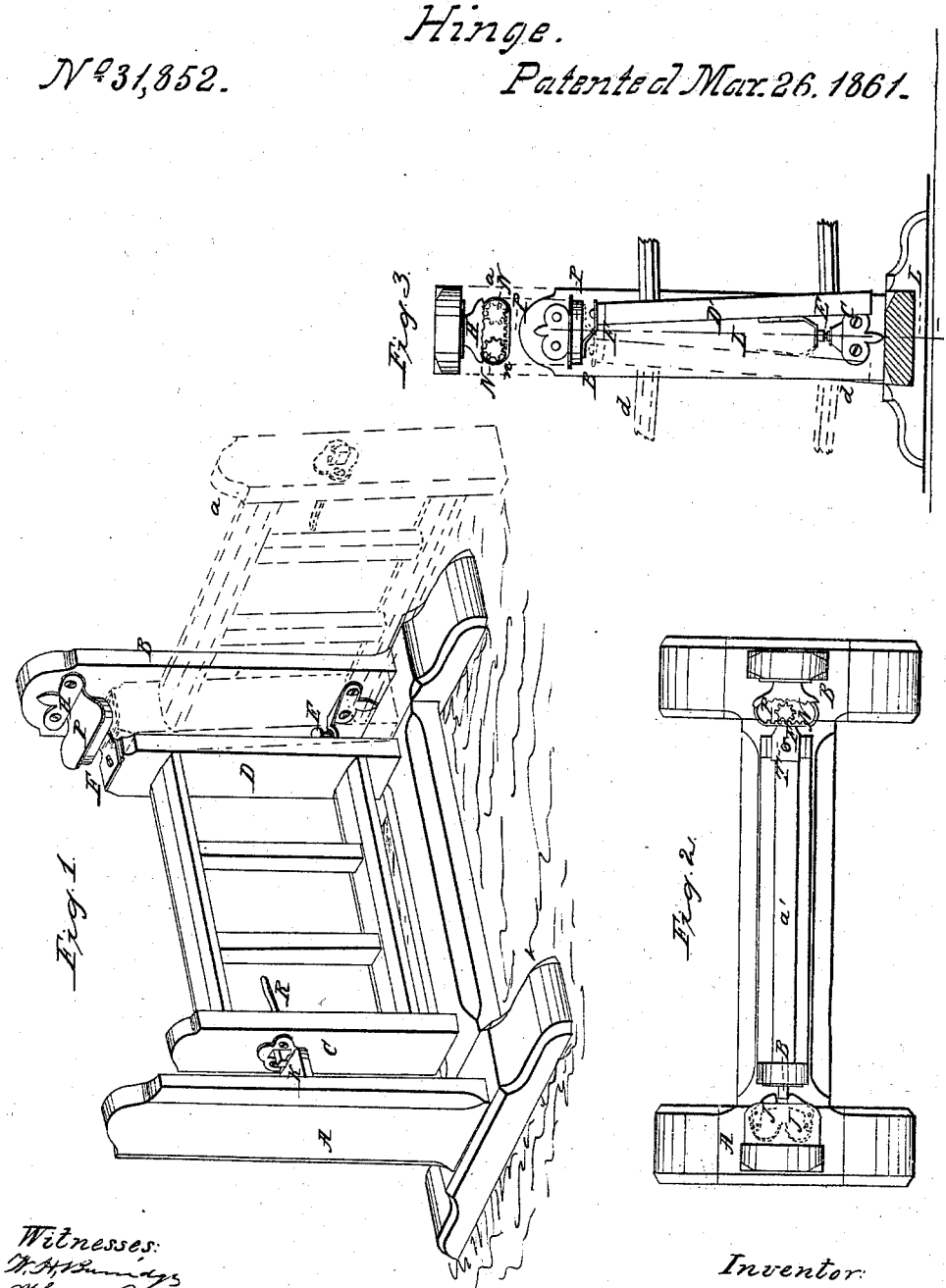

S. J. OLMSTED, OF BINGHAMTON, NEW YORK, ASSIGNOR TO JOHN ELLIS, OF DETROIT, MICHIGAN.

GATE-HINGE.

Specification of Letters Patent No. 31,852, dated March 26, 1861.

*To all whom it may concern:*

Be it known that I, S. J. OLMSTED, of Binghamton, in the county of Broome and State of New York, have invented certain new and useful Improvements in Self-Acting Gate-Hinges; and I do hereby declare that the following is a full and complete description of the construction and operation of the same, reference being had to the accompanying drawings, making a part of this specification, in which—

Figure 1, is a perspective view, Fig. 2, is a plan view, Fig. 3, is a vertical section.

Like letters denote the same parts in the different views.

The nature of my improvement relates to a self acting gate hinge, or an arrangement of devices for hanging gates, whereby the position of the gate, when it is opened, will be so changed, that the force of gravity, will cause the gate to swing shut, in order to find its equilibrium, or balancing point.

In the drawing A, and B, represent the posts of the fence, C, and D, the posts of the gate, which are supported at the lower end, by means of the point and step E, connected to the posts B, and D, by brackets. To the top of the post D, is secured the arm F, to which is attached the pinion N, as shown in Figs. 2, and 3, that works in the rack P. The rack P, is on the inside of an oval formed rim, which is connected by the bracket H, to the post B.

When the gate is closed and latched, as shown in Figs. 1, and 2, the gate is horizontal, and accurately balances, the pinion being in the center of the rack as in Fig. 2, but by opening the gate either way, the pinion moves along in the rack, causing the gravity of the gate to change, for as the pinion turns in the rack, by swinging the gate, the relative position of the gate, to or from its balancing point, is changed, by the action of the pinion in the rack, the pinion moving in the opposite direction from the gate. If the gate is opened as indicated at $a$, in Fig. 1, the pinion will be moved to $n$, Fig. 3, and the lower part of the post, turning around on the point and step E, inclines the post, in the position shown at D′, Fig. 3, which elevates the front part of the gate. In this position the tendency of the gate is to close by its own weight, as the center of gravity, is in the direction of the line L, and the pinion N, Fig. 3, forming the upper axis, and being outside of the line, turns in the rack, changing the position of the gate from $a$, Fig. 1, to $a'$ Fig. 2. Thus following the law of gravitation, which causes the gate to seek its equilibrium, or balancing point, which is indicated by the dotted line L, in Fig. 3, and as it is slightly inclined toward shutting, it will at once swing shut and latch. The catches J, Fig. 2, moving on pivots in the piece K and connected with springs S, that permit the catches to be forced in by the latch R, and immediately to return to their place, by the action of the springs; securing the latch, as shown in Figs. 1 and 2. If the gate is opened in the opposite direction, from that represented in Fig. 1, the pinion and gate will be in the position, indicated by the dotted lines $d$, in Fig. 3, and will close in the way and for the reasons before described. There is a slot T, in the arm F, through which passes a screw into the gate post, to adjust the pinion to the relative position of the gate, in case the gate or posts should sag by any means.

What I claim as my improvement and desire to secure by Letters Patent, is—

The special arrangement of the rack P, the pinion N, and adjustable arm F, in combination with a gate, in the manner and for the purpose substantially as set forth.

SAMUEL J. OLMSTED.

Witnesses:
F. A. DURKEE,
E. C. LEONARD.